(12) United States Patent
Patel et al.

(10) Patent No.: US 11,269,519 B2
(45) Date of Patent: Mar. 8, 2022

(54) QUEUE MANAGEMENT IN STORAGE SYSTEMS

(71) Applicant: International Business Machines Corporation, Armonk, NY (US)

(72) Inventors: Kushal Patel, Pune (IN); Ankur Srivastava, Pune (IN); Subhojit Roy, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 16/734,223

(22) Filed: Jan. 3, 2020

(65) Prior Publication Data

US 2021/0208787 A1 Jul. 8, 2021

(51) Int. Cl.
*G06F 3/06* (2006.01)
*G06F 13/20* (2006.01)

(52) U.S. Cl.
CPC .......... *G06F 3/0611* (2013.01); *G06F 3/0658* (2013.01); *G06F 3/0659* (2013.01); *G06F 3/0679* (2013.01); *G06F 13/20* (2013.01)

(58) Field of Classification Search
CPC .... G06F 3/0659; G06F 3/0679; G06F 3/0611; G06F 3/0658; G06F 13/20
See application file for complete search history.

(56) References Cited

U.S. PATENT DOCUMENTS

| 9,483,431 | B2 | 11/2016 | Bergsten et al. |
| 2012/0158677 | A1 | 6/2012 | Ron |
| 2017/0083252 | A1 | 3/2017 | Singh et al. |
| 2018/0004559 | A1* | 1/2018 | Geml ................ G06F 21/6209 |
| 2019/0155760 | A1 | 5/2019 | Chang |
| 2019/0369911 | A1* | 12/2019 | Rai ...................... G06F 3/0679 |
| 2020/0042236 | A1* | 2/2020 | Subraya ............... G06F 3/061 |

OTHER PUBLICATIONS

NVM Express, "NVM Express Moves Into The Future," NVM Express Inc., retrieved on Jan. 3, 2020, 7 pages, from https://nvmexpress.org/wp-content/uploads/NVMe_Over_Fabrics.pdf.
NVMExpress, "NVM Express," NVM Express Inc, Revision 1.3, May 1, 2017, pp. 1-282, retrieved from https://nvmexpress.org/wp-content/uploads/NVM_Express_Revision_1.3.pdf.

* cited by examiner

*Primary Examiner* — Ernest Unelus
(74) *Attorney, Agent, or Firm* — Zilka-Kotab, P.C.

(57) ABSTRACT

A computer-implemented method, according to one embodiment, includes initiating, by a computer, a connection with a storage controller. A determination is made, by the computer, if a number of compressed volumes on a target side present in a storage system comprising the storage controller. In response to determining at least one compressed volume, a number of queues are dedicated based on the number of compressed volumes. The number of dedicated queues are sent to the storage controller. Moreover, the number of dedicated queues are created. Compressed input/outputs (I/Os) are sent through at least one of the dedicated queues to at least one of the at least one compressed volume via the storage controller.

20 Claims, 7 Drawing Sheets

QUEUE MANAGEMENT IN STORAGE SYSTEMS

BACKGROUND

The present invention relates to input/output (I/O) queue management, and more specifically, this invention relates to I/O queue management in storage systems.

Non-volatile memory express (NVMe) is a storage protocol designed for relatively fast data transfer between servers, storage devices, flash controllers, etc., which conventionally use peripheral component interconnect express (PCIe) buses. The specification of NVMe provides a register interface and a command set that enables high performance I/O. NVMe is an alternative to traditional small computer system interface (SCSI) standards and other standards including serial advanced technology attachment (SATA), serial attached SCSI (SAS), etc., for data transmission across hosts and/or storage systems. NVMe-based PCIe Flash improves upon SAS and SATA-based solid state drives (SSDs) by reducing latency of access in the host software stack, thereby leading to higher input/output operations per second (IOPs) and lower central processing unit (CPU) utilization.

NVMe supports parallel I/O processing with multicore servers which results in faster I/O dispensation and reduction in I/O latency. Due to multiple cores processing I/O requests simultaneously, system performance increases due to optimal utilization of CPU resources. NVMe uses relatively less CPU instructions per I/O. NVMe supports 64,000 commands in a single message queue and a maximum of 65,535 I/O queues.

NVMe over Fabrics (NVMe-oF) is an extension to local PCIe NVMe which provides the benefits of NVMe-like high-performance and low-latency across network fabrics. Servers and storage devices may be connected over an Ethernet network and/or Fibre Channel. Various interconnects support NVMe commands over the fabric for extending the advantages of NVMe protocol to interconnected system components. NVMe-oF preferably adds no more than 10 microseconds of latency for communications between an NVMe host computer and network-connected NVMe storage devices, in addition to the latency associated with accessing a PCIe NVMe storage.

SUMMARY

A computer-implemented method, according to one embodiment, includes initiating, by a computer, a connection with a storage controller. A determination is made, by the computer, if a number of compressed volumes on a target side present in a storage system comprising the storage controller. In response to determining at least one compressed volume, a number of queues are dedicated based on the number of compressed volumes. The number of dedicated queues are sent to the storage controller. Moreover, the number of dedicated queues are created. Compressed input/outputs (I/Os) are sent through at least one of the dedicated queues to at least one of the at least one compressed volume via the storage controller.

A computer program product, according to one embodiment, includes one or more computer readable storage media, and program instructions collectively stored on the one or more computer readable storage media. The program instructions include program instructions to perform the foregoing method.

A computer-implemented method, according to another embodiment, includes receiving, by a computer, a request for a connection with a host, and connecting, by the computer, to the host. A number of compressed volumes on a target side present in a storage system is output. A number of dedicated queues based on the number of compressed volumes is received. Compressed input/outputs (I/Os) are received through at least one of the dedicated queues.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for improving I/O management and CPU binding in NVMe for enhanced application performance in storage systems.

In one general embodiment, a computer-implemented method includes initiating, by the computer, a connection with a storage controller. A determination is made, by the computer, if a number of compressed volumes on a target side present in a storage system comprising the storage controller. In response to determining at least one compressed volume, a number of queues are dedicated based on the number of compressed volumes. The number of dedicated queues are sent to the storage controller. Moreover, the number of dedicated queues are created. Compressed input/outputs (I/Os) are sent through at least one of the dedicated queues to at least one of the at least one compressed volume via the storage controller.

In another general embodiment, a computer program product includes one or more computer readable storage media, and program instructions collectively stored on the one or more computer readable storage media. The program instructions include program instructions to perform the foregoing method.

In yet another general embodiment, a computer-implemented method includes receiving, by a computer, a request for a connection with a host, and connecting, by the computer, to the host. A number of compressed volumes on a target side present in a storage system is output. A number of dedicated queues based on the number of compressed volumes is received. Compressed input/outputs (I/Os) are received through at least one of the dedicated queues.

Figure 1:
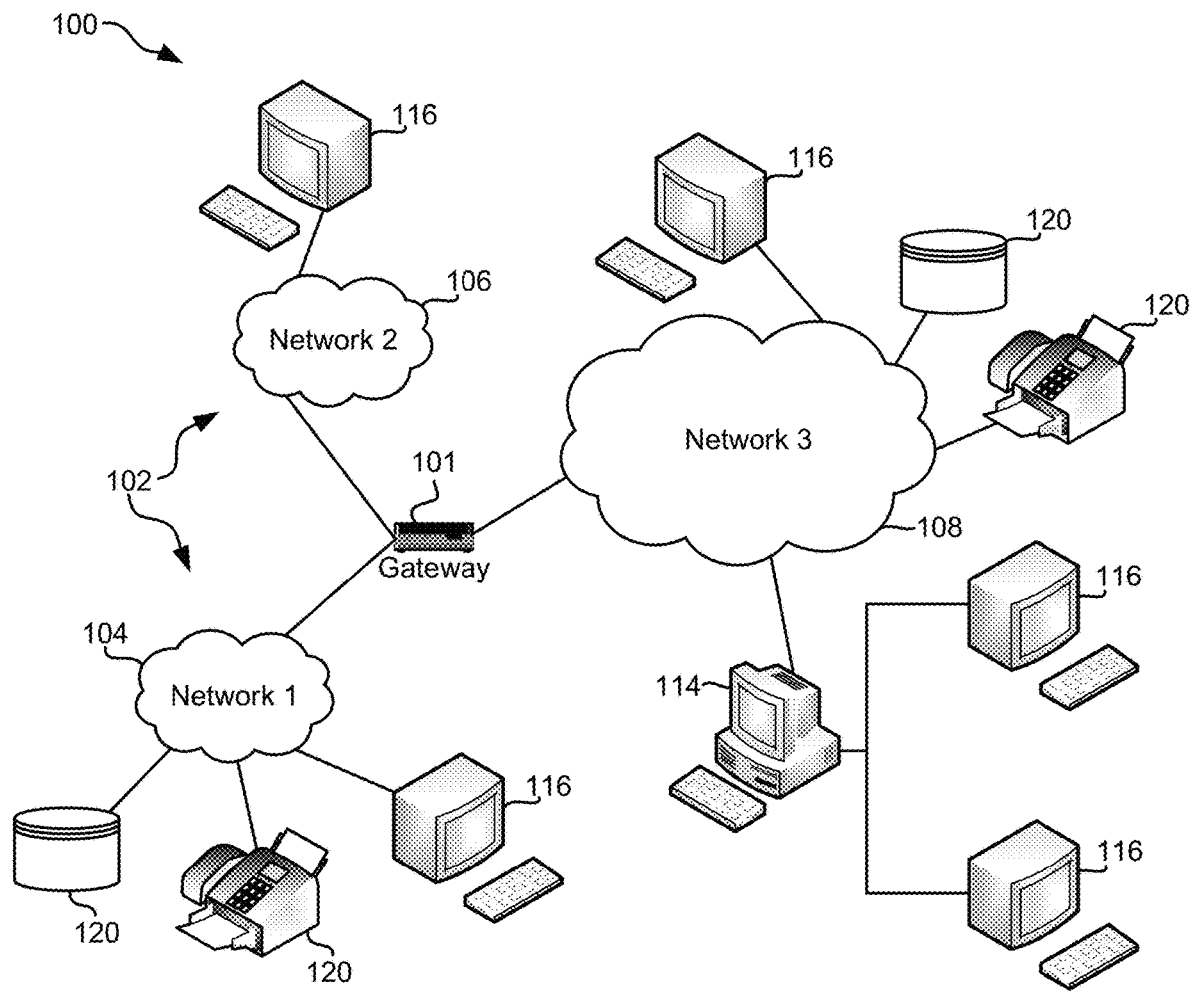
FIG. 1 illustrates a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
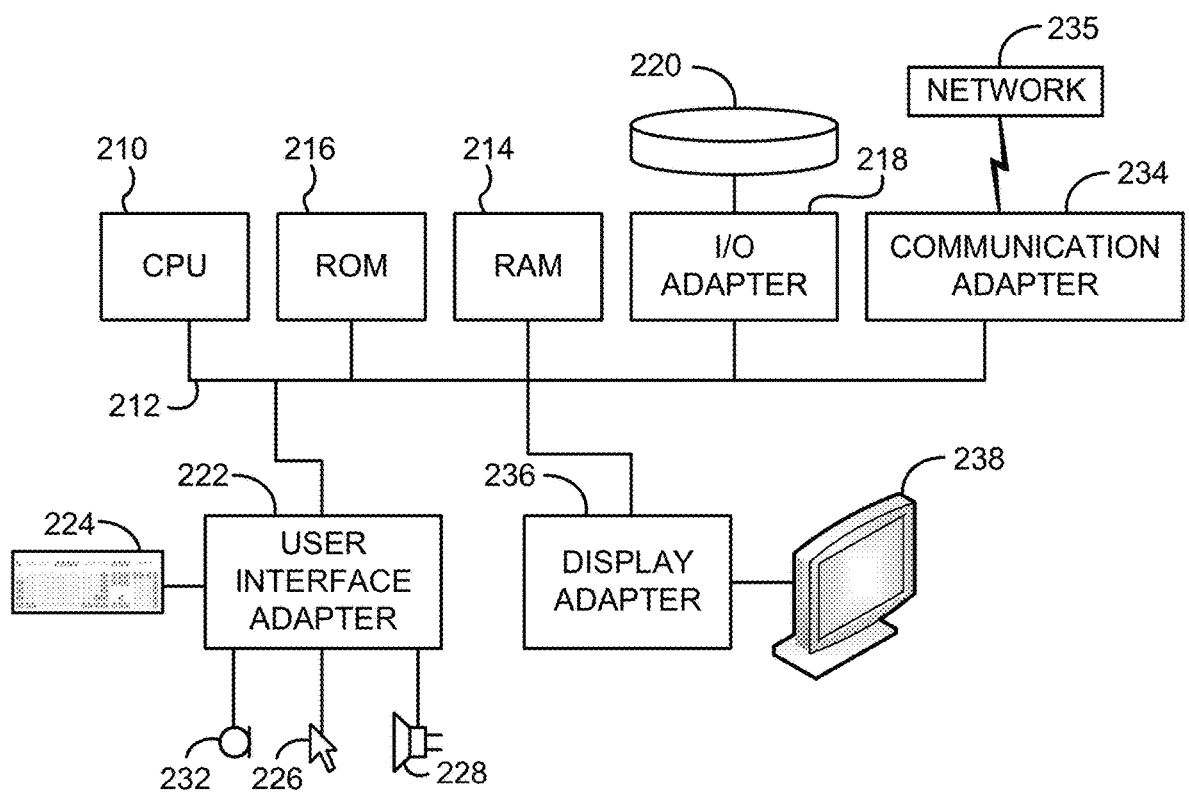
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
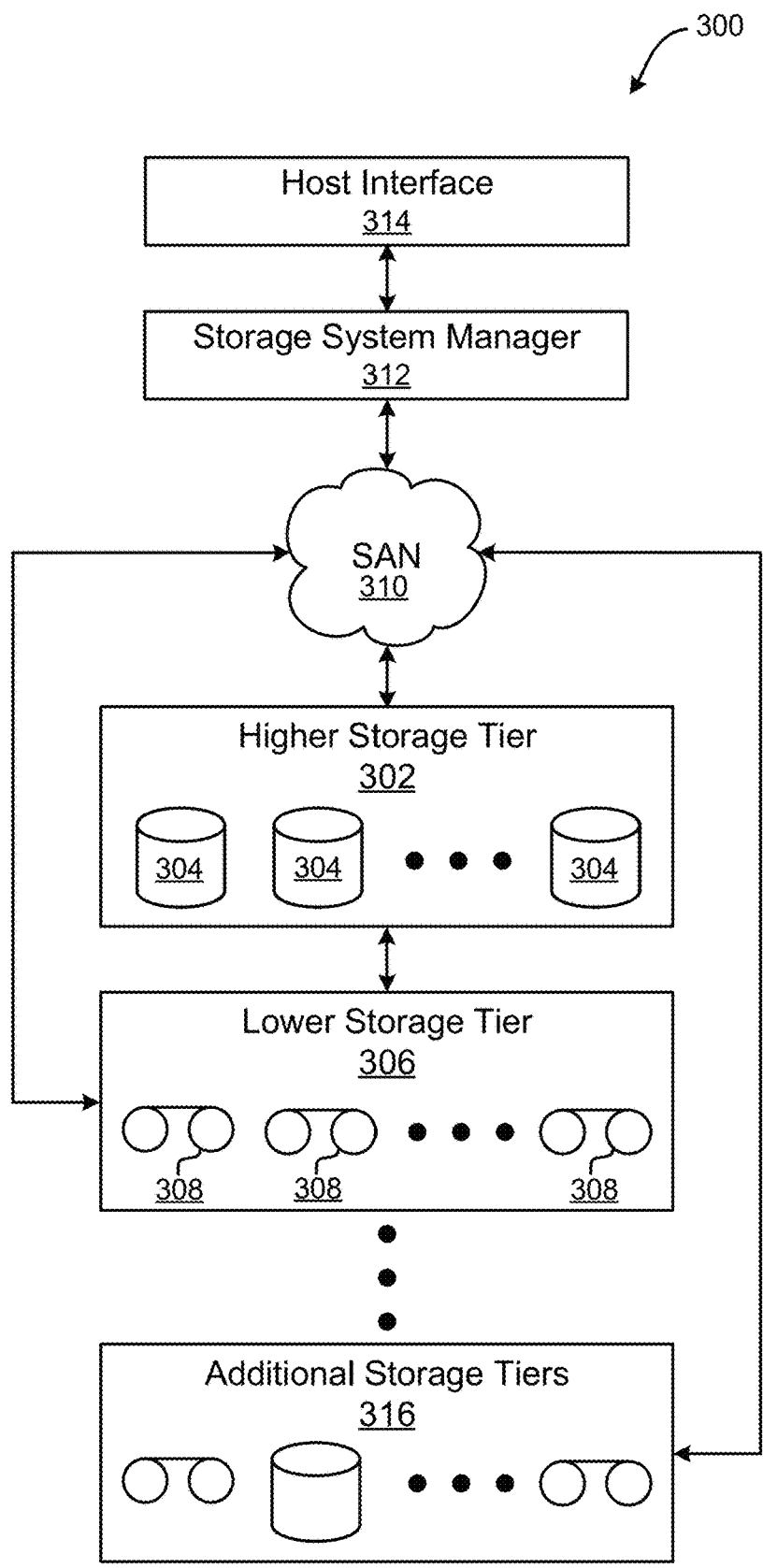
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As stated above, NVMe-oF supports multiple I/O queues for regular I/O operation from hosts to storage systems. A maximum of about 65,000 queues are supported by a typical NVMe with about 64,000 entries in each queue. The host driver creates queues once the connection is established. Once the host is connected to the target system, a special purpose queue is created upon association, e.g., an Admin Queue. The Admin Queue transfers control commands from an initiator to the target device. Once the Admin Queue is created, the Admin Queue is conventionally used by a host to create I/O queues on various system requirements. The host may establish multiple I/O queues to a single controller with the same NVMe qualified name (NQN) and multiple namespaces (e.g., volumes) mapped to the controller. I/O commands may be submitted to the I/O submission queue (SQ) in response to establishing the I/O queues. The I/O responses are conventionally collected from the Completion Queue (CQ). The I/O queues may be added or removed using control instructions sent via the Admin Queue for those sessions.

In response to receiving a command on the target device for I/O queue creation, the target device performs initial system checks for max supported queues and other relevant fields. The target device (e.g., a storage controller associated with the target device) creates an I/O queue and assigns the I/O queue to a CPU core on the storage controller. A response to the queue creation request is returned via the Admin CQ. Conventionally, each I/O queue is assigned to a different CPU core on the storage controller. These assignments allow parallelism and boost throughput of the system. Core assignment logic is implemented at the target storage controller and I/O queues to core mapping is performed based on a predefined policy at the storage controller.

Figure 4:
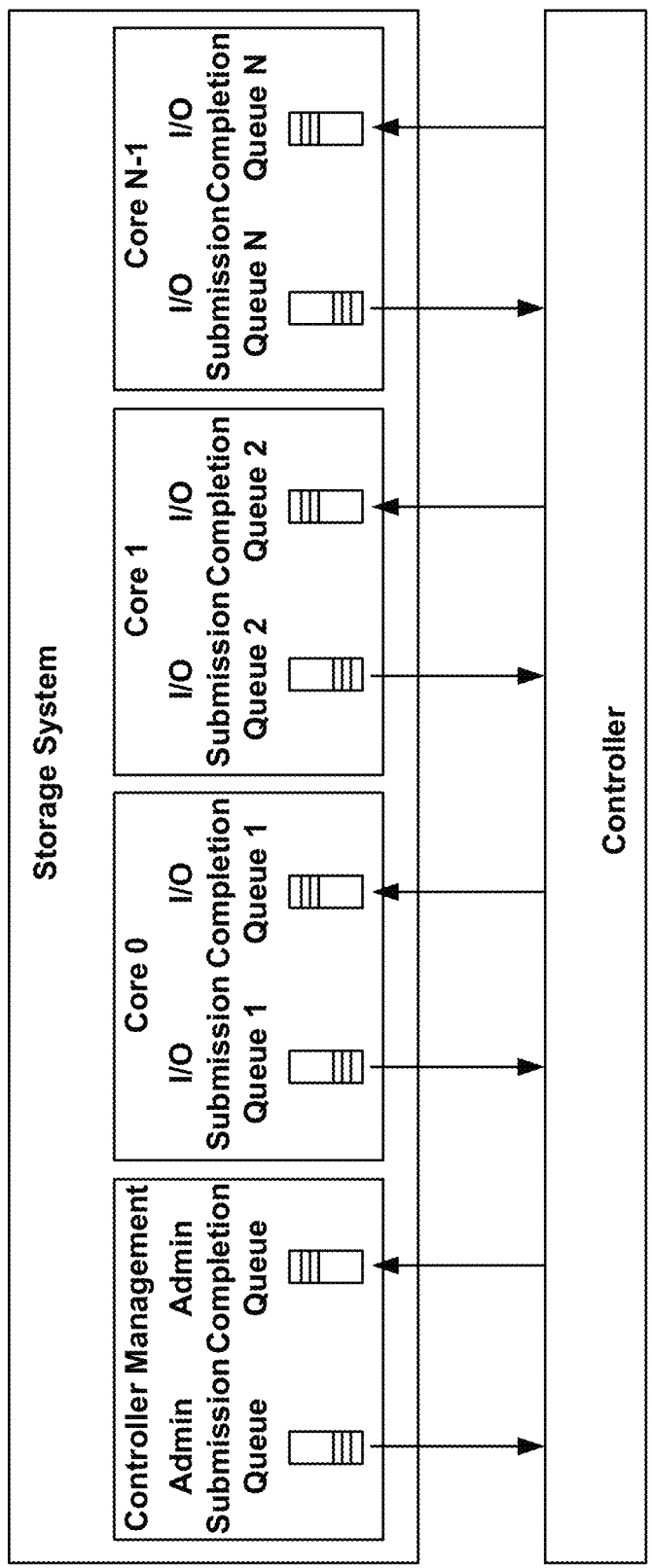
FIG. 4 is a graphical representation of the queue pair mechanism for NVMe core to queue mapping, in accordance with one embodiment of the present invention.

FIG. 4 is a graphical representation of the queue pair mechanism for conventional NVMe core to queue mapping as described above. As shown, a Storage System comprises multiple cores and each Core comprises a paired Submission and Completion Queue. NVMe is based on a paired I/O Submission and Completion Queue mechanism wherein commands are placed by host software into an I/O Submission Queue and completions are placed into an associated I/O Completion Queue by the Controller. Admin Submission Queues and associated Admin Completion Queues are used by the Controller Management for controls (e.g., creation and deletion of I/O Submission and Completion Queues, aborting commands, etc.). Host software creates queues, up to the maximum number of queues supported by the Controller.

An I/O Submission Queue is a circular buffer with a fixed slot size that the host software used to submit commands for execution by the Controller. The Controller fetches I/O Submission Queue entries in order from the I/O Submission Queue and may execute those commands in any order. An I/O Completion Queue is circular buffer with a fixed slot size used to post statuses for completed commands.

NVMe supports queues that may be used for any type of I/O (e.g., compressed, non-compressed, etc.). In one configuration, a storage system has multiple volumes (e.g., compression enabled, non-compression enabled volumes, etc.) and a host which performs I/O operations on an NVMe Target (e.g., storage controller) subsystem. As the host to storage subsystems paths and NVMe queues are shared for all the volumes, I/Os flowing from an I/O queue may be compressed or non-compressed. In response to a particular I/O reaching the storage controller, the storage controller performs initial necessary checks to conclude whether the received I/O is for a compressed volume or not. If the received I/O is for a compressed volume, the controller compresses the data and saves the compressed data to designated logical block addressing (LBAs) of the volume. Alternatively, if the received I/O is for a non-compressed volume, the controller decompresses the data and saves the decompressed data to designated LBAs of the volume. In response to a read request from a host and, in response to receiving a response to the read request, the host verifies whether the I/O is compressed or non-compressed prior to performing the necessary action (e.g., decompressing the data before catering the data to the user). The various checks performed in conventional I/O processes are CPU cycle intensive. The relatively high number of CPU cycles affects host application performance in terms of I/O throughput and turnaround time. In conventional processes, there is no way to skip these checks for compressed/non-compressed I/O identification before fetching the I/O on the volumes and/or sending the I/O back to the user.

Performing compression and decompression of the data includes CPU intensive operations. Some storage systems allow software-based compression only on some of the CPU cores so that non-compressed I/Os are not affected during heavy compression workloads. There may be relatively stronger CPU cores compared to relatively weaker CPU cores in the same storage system. If the host sends the compression traffic to a queue that is assigned to a relatively weaker CPU core, the CPU core may become overloaded and affect other I/O operations coming from the various queues in the same core. As the NVMe storage target allocates the cores to the I/O queues, conventional methods lack mechanisms that sense for the compression-based workloads and/or allocate relatively more powerful CPUs to the compression queues.

All of the queues created between a host and storage controller may be used for any type of I/O transmission, however, there is no conventional technique for sensing the amount of compressed and non-compressed I/Os in each queue per unit time, resulting in substantially continuous I/O checks for determining whether the I/O is compressed or non-compressed on both sides (e.g., the host side and the controller side). As a result of these checks, IOPs are decreased due to multiple CPU cycles for determining the I/O type. Conventional storage systems experience latency and degraded overall host I/O throughput as a result of the checks and other deficiencies described herein.

Figure 5:
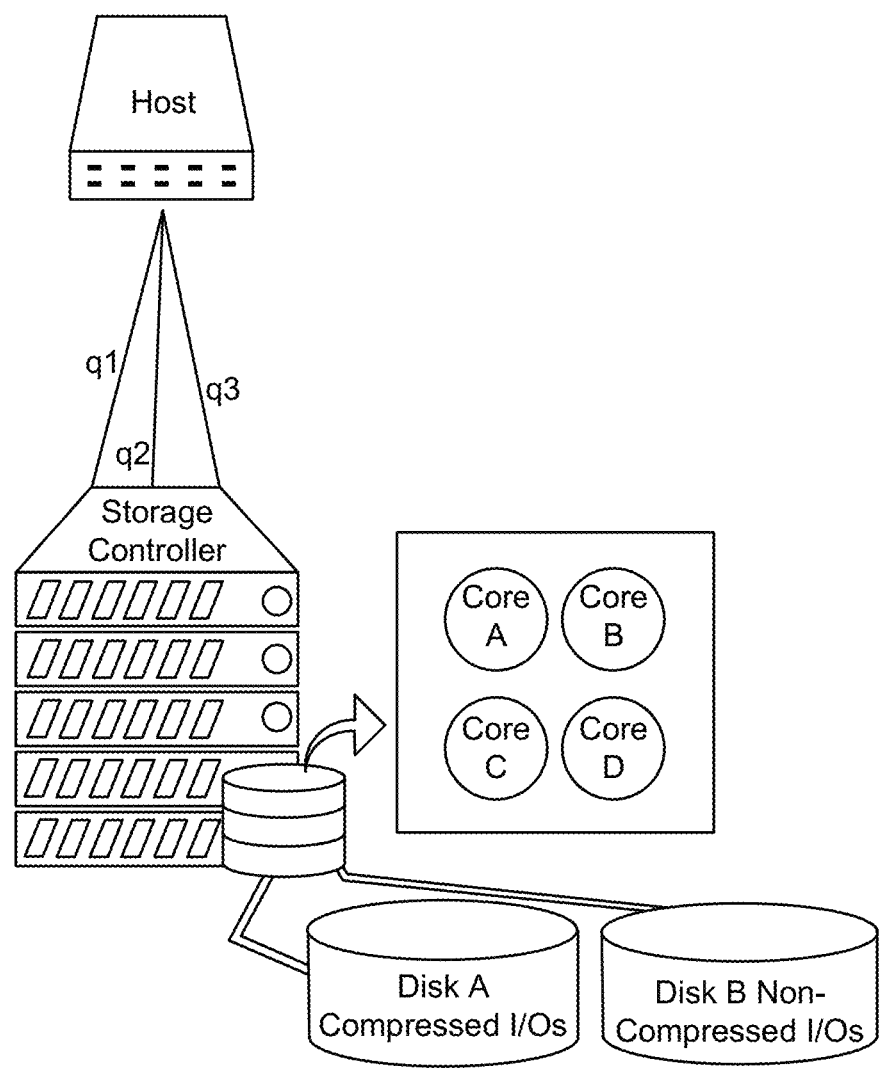
FIG. 5 is an exemplary storage system, in accordance with one embodiment of the present invention.

FIG. 5 is an exemplary storage system. Host is connected to the Storage Controller and I/O queues (e.g., q1, q2, q3, etc.) are established to four CPU cores (e.g., Core A, Core B, Core C, Core D) by the Host. In this exemplary storage system, Host is continuously pumping I/Os to the Storage Controller and the nature of each I/O is checked (e.g., compressed, non-compressed, etc.) before reading the I/O to and/or from the volumes and/or before sending the I/O to the user. The check is performed in the I/O path, thereby adding latency to every I/O. The compressed data may be sent to the low-power processor, thereby further increasing I/O latency. Conventional storage systems lack the ability to control the location and/or segregation of compressed I/Os to faster performing cores based on the compressed nature of the I/Os.

In one exemplary configuration of the storage system represented by FIG. 5, a majority of the compressed data is randomly sent to Core A which is relatively less powerful than each of Cores B, C, and D. Core A is overloaded and the other cores receive relatively less compressed I/Os, resulting in a system imbalance. System imbalances are problematic in conventional storage systems.

Compressed and/or non-compressed volumes are mapped to the host subsystem and the host accesses the volumes using the NVMe protocol such that the host NVMe driver may use any queue to transmit I/Os to the volumes. Every I/O entering the storage layer is checked by the storage volume. If the volume is a compressed volume, the CPU compresses the data and processes the I/O for saving the data to the persistent disk storage. If the volume is not compressed, the CPU processes the I/O differently. Compression requires extensive CPU power. If there are multiple queues sending compressed data, the CPU cores may be overworked where a compressed volume and associated I/O queue are bound to relatively less powerful core. Less powerful cores may be overloaded due to the compression and/or decompression of data which is randomly sent via conventional processes. The I/O performance for multi-volume access is degraded every time the storage system checks which I/O is coming from the host and the nature of the volume. The extensive CPU processing required for compression and/or decompression degrades the I/O performance for multi-volume access.

An existing solution depends on the type of storage system and volume capability associated with the storage system (e.g., if the system is capable of taking only one type of I/O (e.g., compressed, non-compressed, etc.)), there are no additional checks to verify the nature of the I/O and off-course the volume capabilities to cater both types of I/Os. However, there is no mechanism to distinguish the type and/or select the queue to transmit the data to the storage controller and/or select a core for the I/Os.

In stark contrast, various embodiments of the present disclosure create dedicated I/O queues for compressed and/or non-compressed I/Os associated with a NVMe storage controller to decrease performance degradation, thereby improving response times and/or IOPs.

In one configuration, the host establishes the I/O queues with the storage controller. The host sets a flag via a protocol command in-band for every queue, thereby indicating the particular queue(s) to be dedicated for compressed or non-compressed I/Os. In various approaches, setting the flag for dedicating the queues depends on whether and/or how many compressed volumes are present in the storage system. The host may set the flag at the beginning and/or in response to the addition and/or removal of specific volume(s).

In a preferred configuration, the host and/or the storage controller dedicate the queues sequentially. For example, for a given host-target connection in which the host dedicates 3 out of 8 I/O queues (IOQs) for compressed I/Os, the queues are dedicated serially, e.g., IOQs 1, 2, 3 are dedicated to compressed I/Os and IOQs 4, 5, 6, 7, and 8 are dedicated to non-compressed I/Os. Dedicating queues avoids bottlenecks by keeping queue by queue information regarding whether queues are dedicated for compressed I/Os or non-compressed I/Os.

Figure 6:
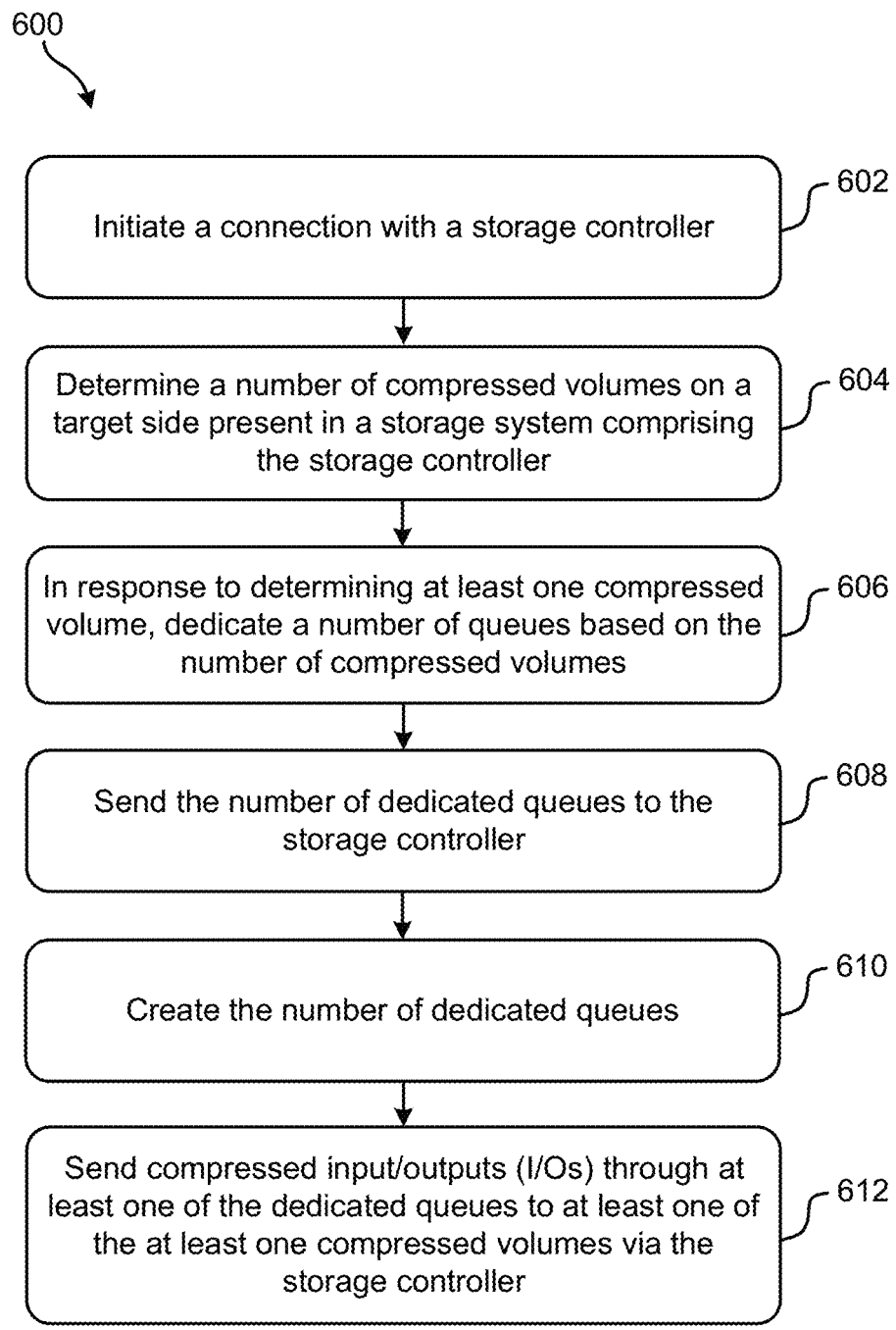
FIG. 6 is a flowchart of a method, in accordance with one embodiment of the present invention.

Now referring to FIG. 6, a flowchart of a method 600 is shown according to one embodiment. The method 600 may be performed in accordance with the present invention in any of the environments depicted in FIGS. 1-5 and 7-8, among others, in various embodiments. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 includes operation 602. Operation 602 includes initiating a connection with a storage controller. In various approaches, the host initiates a connection with a storage controller on a target side in a storage system. In a preferred embodiment, the host initiates a Fabric connection via a Fabric Connect command to the storage controller. In various approaches, the fabric connection is followed by an IOQ connection. The host may discover (e.g., initiate a connection with) the target side and/or the storage controller in any manner known in the art. In a preferred configuration, NVMe enables the host to discover the target and establish a connection to the storage controller via an Admin Queue as discussed in detail above.

Operation 604 includes determining a number of compressed volumes on a target side present in the storage system comprising the storage controller. In various approaches, the compressed volumes in the storage system fabric are determined through a connect response. In a preferred configuration, the storage controller sends a Fabric Connect response and/or special application programming interface (API) to the host comprising the total number of compressed volumes (e.g., vDisk/volumes) present in the storage system. Determining and/or receiving a number of compressed volumes on a target side present in the storage system comprising the storage controller may be performed in any manner known in the art.

Operation 606 includes, in response to determining at least one compressed volume, dedicating a number of queues based on the number of compressed volumes. The target side of the storage system may comprise any number of and/or combination of compressed volumes and/or non-compressed volumes as would be understood by one having ordinary skill in the art. Dedicated queues may be dedicated for compressed I/Os, non-compressed I/Os, any other types of I/Os, or any combination thereof. In a preferred embodiment, dedicated queues are queues which are dedicated for compressed I/Os. In preferred approaches, the host dedicates queues based on the number of compressed volumes present on the target side. The number of dedicated queues may be proportional to the number of compressed volumes present on the target side relative to the number of non-compressed volumes on the target side. In various approaches, the number of dedicated queues based on the number of compressed volumes may be readily determinable by one having ordinary skill in the art based on system requirements, application requirements, etc. Non-dedicated queues may refer to queues for non-compressed I/Os. In other approaches, the non-dedicated queues may refer to queues for non-compressed I/Os and excess compressed I/Os. In various approaches, the host may dedicate a number of queues based on the number of non-compressed volumes.

In various approaches, at the time of creating I/O requests and establishing an Admin Queue, the host may set a flag for whether the queue is for compressed or non-compressed data transmission. In response to receiving the data request at the storage controller, the storage controller may decode the flag and determine the type of data based on the I/O queue. If the flag comes with the compression, the storage controller may pull back and the queue may be used for compressed data. Accordingly, the core is assigned the I/O queue in at least some embodiments.

Operation 608 includes sending the number of dedicated queues to the storage controller. In another configuration, method 600 may include sending a number of non-dedicated queues to the storage controller. In yet another configuration, method 600 may include sending the number of dedicated queues and the number of non-dedicated queues to the storage controller.

In a preferred embodiment, the host sends the number of dedicated queues to the storage controller using a special API and/or a Set Feature Command as would be understood by one having ordinary skill in the art upon reading the present disclosure. In various approaches, the host communicates how many queues out of a total number of queues are dedicated to compressed I/Os. The storage system comprises a plurality of queues wherein at least some queues are non-dedicated queues and the other queues are dedicated queues. In some approaches, it should be understood by one having ordinary skill in the art that, in response to determining there are no compressed volumes (e.g., zero compressed volumes), the host may send "0" as the number of dedicated queues to the storage controller.

In various embodiments, the host sends any associated information with the number of dedicated queues to the storage controller. Associated information may include the Queue ID, the number of non-dedicated queues, the total number of queues, etc. In a preferred embodiment, the Queue ID may be sent to the storage controller and used for compression. In response to receiving the Queue ID at the NVMe driver of the host subsystem, the host updates the mapping saved from the compressed I/O.

In preferred approaches, the queue dedication occurs serially as described above. For example, the queue dedication may start from IOQ 1 and proceed to IOQ 2, IOQ 3, etc.

Operation 610 includes creating the number of dedicated queues. In preferred embodiments, the host creates the I/O queues comprising the dedicated queues and the non-dedicated queues. In other approaches, the storage controller creates the number of dedicated queues. In various approaches, any handshaking protocol known in the art may be used to communicate and/or create the number of dedicated queues and/or the identification of the dedicated queues to the storage controller.

Operation 612 includes sending compressed I/Os through at least one of the dedicated queues to at least one of the compressed volumes via the storage controller. Specifically, compressed I/Os may be pumped to the compressed volume(s) on the target side via the dedicated queue(s). Equivalently, non-compressed I/Os may be sent through at least one non-dedicated queue to a non-compressed volume via the storage controller.

In one configuration, method 600 includes selecting the core based on the nature of the I/O traffic that the queue is serving. Allocating the cores to the IOQs may include identifying an associated compression flag by core allocation logic. For the IOQs that are designated for compressed I/Os, a relatively more powerful CPU may be allocated to the core due to the CPU intensive nature of compression. Any technique known in the art may be used to determine relatively more powerful cores compared to other cores in the storage system. Equivalently, any technique known in the art may be used to determine relatively weaker cores compared to other cores in the storage system. Selecting a relatively more powerful core for dedicated queues reduces bottlenecks which tend to occur for I/Os served on relatively lower end CPUs. The NVMe driver associated with the host may be instructed to send the compressed I/Os on the dedicated queues and exchange the volume nature mapping to the host driver for inheriting the nature of the volume at the host system.

In various approaches, method 600 includes updating the number of dedicated queues in response to detecting deletion of one or more of the at least one compressed volumes. The number of dedicated queues may be adjusted in response to the removal and/or the addition of compressed volumes in the storage system as would be apparent to one having ordinary skill in the art upon reading the present disclosure. For example, in response to the deletion and/or detachment of a compressed volume (e.g., detachment from an affinity for compressed I/Os, non-compressed I/Os, etc.), the target side may notify the host through an asynchronous event request (AER) recognizing the target storage controller event. The host may refresh the new configuration and/or the queue properties in response to receiving the AER from the storage controller.

In other approaches, method 600 includes updating the number of dedicated queues in response to the passage of a predefined period of time since a compressed I/O is sent. The predefined period of time may be set by the user, the host, the host application, the storage controller, etc. The predefined period of time may be any period of time. The predefined period of time may be periodic and/or dynamic. The predefined period of time may be determinable by one having ordinary skill in the art based on historical storage requirements and/or usage in view of the teachings of the present disclosure. It should be understood by one having ordinary skill in the art that the number of dedicated queues may be updated at any point in time.

In yet other approaches, method 600 includes updating the number of dedicated queues in response to sending a predefined number of non-compressed I/Os and/or compressed I/Os. The predefined number of non-compressed I/Os may equivalently refer to a predefined number of compressed I/Os in various approaches. The predefined number may be set by the user, the host, the host application, the storage controller, etc. The predefined number may be any number. The predefined period of time may be periodic and/or dynamic. The predefined number may be determinable by one having ordinary skill in the art based on historical storage requirements and/or usage in view of the teachings of the present disclosure.

Figure 7:
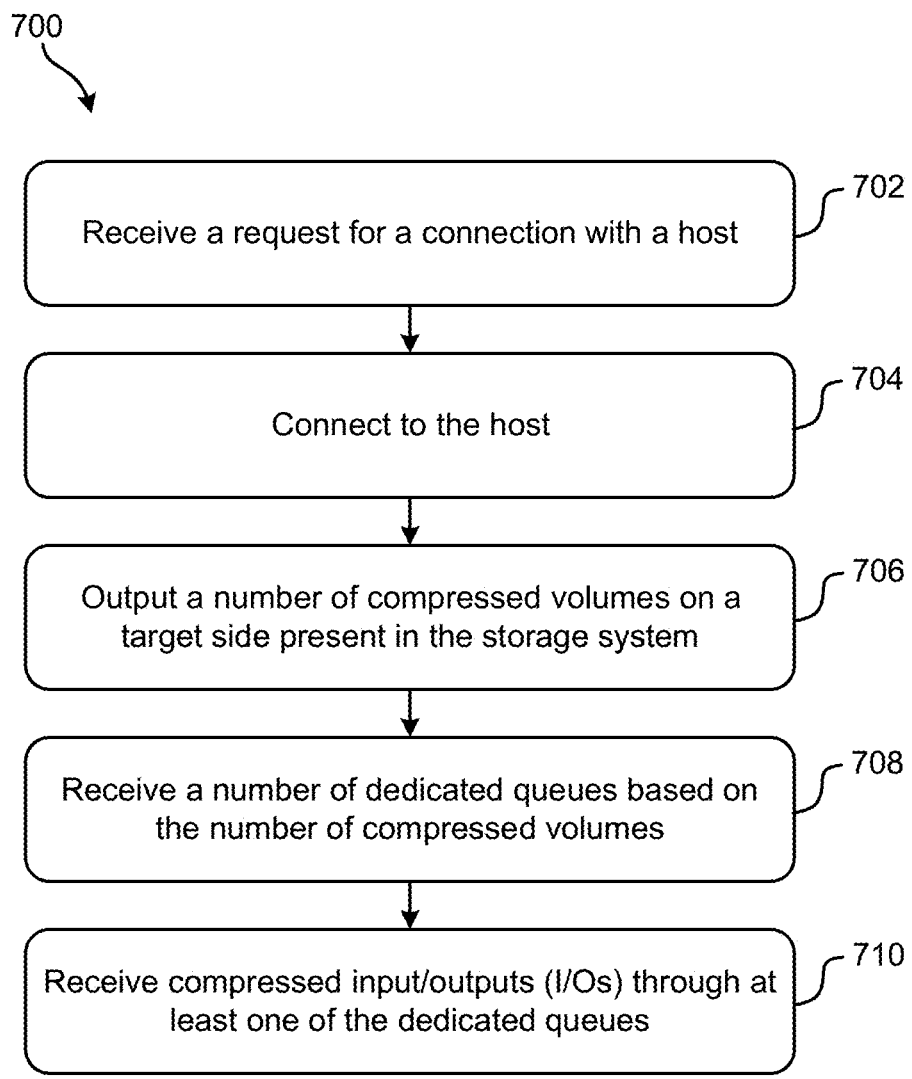
FIG. 7 is a flowchart of a method, in accordance with one embodiment of the present invention.

Now referring to FIG. 7, a flowchart of a method 700 is shown according to one embodiment. The method 700 may be performed in accordance with the present invention in any of the environments depicted in FIGS. 1-6 and 8, among others, in various embodiments. Of course, more or fewer operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 includes operation 702. Operation 702 includes receiving a request for a connection with a host. A request for a connection with the host may be received in any manner known in the art. In various approaches, the request for a connection with the host may be received at the storage controller.

Operation 704 includes connecting with the host. In at least some approaches, the connection is between the host and the storage controller. In a preferred configuration, the storage controller on a target side may connect with the host via a Fabric Connect.

Operation 706 includes outputting a number of compressed volumes on a target side present in the storage system. In a preferred configuration, at least one compressed volume is present on the target side of the storage system. In preferred embodiments, the storage controller on the target side determines a number of compressed volumes are present on the target side of the storage system and outputs the number of compressed volumes to the host. In various approaches, the host and/or the storage controller may determine the number of compressed volumes on a target side present in the storage system in any manner known in the art.

Operation 708 includes receiving a number of dedicated queues based on the number of compressed volumes. In various approaches, according to at least some of the embodiments described in detail above, the host determines a number of dedicated queues based on the number of compressed volumes. See operation 606 of method 600. Dedicated queues may be dedicated for compressed I/Os, non-compressed I/Os, any other type of I/Os, or any combination thereof. In a preferred embodiment, dedicated queues are queues which are dedicated for compressed I/Os. In various approaches, the storage controller receives any related information discussed in detail above including, but not limited to, the number of dedicated queues, the number of non-dedicated queues, the queue ID, etc.

In some approaches, the storage controller may create the dedicated I/O queues and/or any other I/O queues to be created. In other approaches, the host creates the dedicated I/O queues and/or any other I/O queues to be created and the storage controller is aware of the dedicated queues among any other queues which are created by the host.

Operation 710 includes receiving compressed I/Os through at least one of the dedicated queues. In preferred configurations, the storage controller does not check whether the I/O is compressed or non-compressed (e.g., according to conventional protocols). Rather, the storage controller directly pumps compressed I/Os to compressed volumes through at least one of the dedicated queues. Equivalently, the storage controller directly pumps non-compressed I/Os to non-compressed volumes through non-dedicated queues as would be understood by one having ordinary skill in the art upon reading the present disclosure.

In various configurations, a host may establish a connection with a storage controller having both types of volumes (e.g., compressed and non-compressed). The target (e.g., storage controller) has prior information about the types of volumes the target is associated with and the target may easily send information to the host via the reserved fields of either Fabric Connect response and/or through in-band protocol and/or out-of-band APIs which possess various capabilities to communicate between hosts and the storage controller clustered system. The information may be 1 byte or more (e.g., depending upon the maximum capacity of volumes the target may hold) for an integer value which implies the presence of a compressed volume. If there are no compressed volumes present in the system, there is no need for dedicating any queue for compressed I/Os and the integer value is 0, else the value is the total number of compressed volumes associated with the storage controller.

Detection of the total number of compressed volumes in the system optimizes the queue management operations disclosed herein. In one example, a system comprises 64 volumes and 8 IOQs associated with the storage controller. One or two of the volumes are compressed, accounting for about 0.1015% or 0.031% of the total volumes present in the system, respectively. In this example, dedicating multiple queues for compressed I/Os is not preferred. The non-compressed I/Os suffer from less host-target paths and high non-compressed I/O quantities. Less IOQs are dedicated for compressed I/Os and vice versa for a system having 60% to 70% compressed volumes. In an example having more compressed volumes in the system, more queues are dedicated to compressed I/Os.

In another example, a system comprises 8 IOQs and 8 compressed volumes out of 64 total volumes. The host may dedicate 2 queues for compressed I/Os. The host may use a reserved field from the Set feature command to send the number of queues (e.g., the number of dedicated queues for compressed I/Os) and/or through out-of-band protocol using external APIs implemented with capabilities of communicating between hosts and the storage controller. In response to removing all of the compressed volumes from the storage controller and/or the host dedicating 1 compressed IOQ instead of 2, rededicating the queues may be achieved through the asynchronous event request for notifying the host of the current situation of volumes present in the storage system, and the host may take any necessary action in order to refresh the properties of the queues.

In various embodiments, the host capability is automatically increased for sending the particular type of I/O (e.g., compressed, non-compressed, etc.) to the queues dedicated for that type of I/O. On the target side, the storage controller is aware that the I/Os are getting through the particular queues so that all the unnecessary checks for determining the type of I/O (e.g., compressed, non-compressed, etc.) on both the target and the host (e.g., the initiator) side are not there to create a burden in the I/O path.

Communication between a NVMe queue manage and a host notifier may be through out-of-band protocol using out-of-band APIs implemented that possess capabilities to communicate between hosts and the storage controller clustered system. In some approaches, both systems use in-band communication using NVMe standards. Queue overlapping information and actuator signals may be passed as part of protocol frames programmatically. Passing the queue overlapping information and actuator signals may be passed using reserved fields of IOQ Connect response frame/Set Feature Command frame/Identity Controller, Namespace, Namespace list command/response frame to communicate the queue properties.

The various embodiments described herein reduce hybrid I/O bottlenecks. The host "knows" which queues are dedicated for compressed and/or non-compressed I/Os so the host may directly pump the respective type of I/O to the respective queues (e.g., dedicated or non-dedicated) which results in less overhead in terms of unnecessary checks done at the host and/or at the storage controller.

A further benefit included in at least some of the embodiments described herein is improved performance. Specifically, performance is improved where the host is performing both compressed and non-compressed I/Os simultaneously. Performance is usually degraded as the host and/or the target side perform all the necessary checks to determine whether the I/O is compressed or non-compressed. Various embodiments of the present disclosure avoid performance degradation by preemptively checking the nature of the I/O and routing the I/O accordingly.

Yet another improvement provided by various embodiments of the present disclosure includes better CPU utilization. As the cores are allocated based on the nature of the traffic on the queue (e.g., compressed I/Os versus non-compressed I/Os), higher performing CPUs are allocated to the support the compression workload in the storage system rather than overloading relatively weaker CPUs. Furthermore, in response to dedicating queues for compressed and/or non-compressed I/Os, host I/O turnaround time is reduced, thereby increasing overall IOPs.

At least some of the embodiments presented herein may be implemented in any known storage system architecture or may be adapted for any future storage system architecture as would be understood by one having ordinary skill in the art upon reading the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    initiating, by a computer, a connection with a storage controller;
    determining, by the computer, a number of compressed volumes on a target side present in a storage system comprising the storage controller;
    in response to determining at least one compressed volume, dedicating, by the computer, a number of queues based on the number of compressed volumes;
    sending, by the computer, the number of dedicated queues to the storage controller;
    creating, by the computer, the number of dedicated queues;
    sending, by the computer, compressed input/outputs (I/Os) through at least one of the dedicated queues to at least one of the at least one compressed volume via the storage controller, wherein the dedicated queues are dedicated for only the compressed I/Os; and sending, by the computer, non-compressed I/Os only through a non-dedicated queue to a non-compressed volume on the target side present in the storage system via the storage controller, wherein the storage controller does not check whether the I/Os are compressed or non-compressed while operating.

2. The computer-implemented method of claim 1, comprising updating, by the computer, the number of dedicated queues in response to detecting deletion of at least one of the at least one compressed volumes.

3. The computer-implemented method of claim 1, comprising updating, by the computer, the number of dedicated queues in response to the passage of a predefined period of time since a compressed I/O is sent.

4. The computer-implemented method of claim 1, comprising updating, by the computer, the number of dedicated queues in response to sending a predefined number of compressed I/Os.

5. The computer-implemented method of claim 1, comprising updating, by the computer, the number of dedicated queues in response to sending a predefined number of non-compressed I/Os.

6. The computer-implemented method of claim 1, wherein the dedicated queues are mapped to relatively more powerful central processing units (CPUs) compared to other CPUs in the storage system.

7. A computer program product, the computer program product comprising:

one or more computer readable storage media, and program instructions collectively stored on the one or more computer readable storage media, the program instructions comprising:

program instructions to initiate a connection with a storage controller;

program instructions to determine a number of compressed volumes on a target side present in a storage system comprising the storage controller;

program instructions to, in response to determining at least one compressed volume, dedicate a number of queues based on the number of compressed volumes;

program instructions to send the number of dedicated queues to the storage controller;

program instructions to create the number of dedicated queues;

program instructions to send compressed input/outputs (I/Os) through at least one of the dedicated queues to at least one of the at least one compressed volume via the storage controller, wherein the dedicated queues are dedicated for only the compressed I/Os; and program instructions to send non-compressed I/Os only through a non-dedicated queue to a non-compressed volume on the target side present in the storage system via the storage controller, wherein the storage controller does not check whether the I/Os are compressed or non-compressed while operating.

8. The computer program product of claim 7, comprising program instructions to update the number of dedicated queues in response to detecting deletion of at least one of the at least one compressed volumes.

9. The computer program product of claim 7, comprising program instructions to update the number of dedicated queues in response to the passage of a predefined period of time since a compressed I/O is sent.

10. The computer program product of claim 7, comprising program instructions to update the number of dedicated queues in response to sending a predefined number of compressed I/Os.

11. The computer program product of claim 7, comprising program instructions to update the number of dedicated queues in response to sending a predefined number of non-compressed I/Os.

12. The computer program product of claim 7, wherein the dedicated queues are mapped to relatively more powerful central processing units (CPUs) compared to other CPUs in the storage system.

13. A system, comprising:

a processor; and logic integrated with the processor, executable by the processor, or integrated with and executable by the processor, the logic being configured to:

initiate a connection with a storage controller;

determine a number of compressed volumes on a target side present in a storage system comprising the storage controller;

in response to determining at least one compressed volume, dedicate a number of queues based on the number of compressed volumes;

send the number of dedicated queues to the storage controller;

create the number of dedicated queues;

send compressed input/outputs (I/Os) through at least one of the dedicated queues to at least one of the at least one compressed volume via the storage controller, wherein the dedicated queues are dedicated for only the compressed I/Os; and send non-compressed I/Os only through a non-dedicated queue to a non-compressed volume on the target side present in the storage system via the storage controller, wherein the storage controller does not check whether the I/Os are compressed or non-compressed while operating.

14. The system of claim 13, comprising logic configured to update the number of dedicated queues in response to detecting deletion of at least one of the at least one compressed volumes.

15. The system of claim 13, comprising logic configured to update the number of dedicated queues in response to the passage of a predefined period of time since a compressed I/O is sent.

16. The system of claim 13, comprising logic configured to update the number of dedicated queues in response to sending a predefined number of compressed I/Os.

17. The system of claim 13, comprising logic configured to update the number of dedicated queues in response to sending a predefined number of non-compressed I/Os.

18. The system of claim 13, wherein the dedicated queues are mapped to relatively more powerful central processing units (CPUs) compared to other CPUs in the storage system.

19. The computer-implemented method of claim 1, wherein the queues are dedicated sequentially for avoiding bottlenecks.

20. The computer program product of claim 7, wherein the queues are dedicated sequentially for avoiding bottlenecks.

* * * * *